United States Patent [19]

Stüben et al.

[11] 4,167,380

[45] Sep. 11, 1979

[54] APPARATUS FOR THE MANUFACTURE OF LAYERED ARTICLES SUCH AS MULTILAYER TABLETS

[75] Inventors: Werner Stüben, Büchen; Ulrich Zeuschner, Schwarzenbek, both of Fed. Rep. of Germany

[73] Assignee: Wilhelm Fette GmbH, Schwarzenbek, Fed. Rep. of Germany

[21] Appl. No.: 828,964

[22] Filed: Aug. 29, 1977

[30] Foreign Application Priority Data

Aug. 31, 1976 [DE] Fed. Rep. of Germany ....... 2639090

[51] Int. Cl.[2] ............................................. B29D 31/00

[52] U.S. Cl. .................................... 425/134; 425/186; 425/219; 425/259; 425/804

[58] Field of Search ............... 425/134, 259, 804, 219, 425/359, 361, 186, 447, 453

[56] References Cited

U.S. PATENT DOCUMENTS

| | | | |
|---|---|---|---|
| 2,218,456 | 10/1940 | Soubier et al. | 425/259 X |
| 2,717,417 | 9/1955 | Rigsby | 425/134 |
| 2,970,554 | 2/1961 | Haupt | 425/219 |
| 3,599,283 | 8/1971 | Budai et al. | 425/219 X |
| 3,633,245 | 1/1972 | Partos | 425/259 X |
| 3,744,950 | 7/1973 | Courtois | 425/186 |

*Primary Examiner*—Robert L. Spicer, Jr.
*Attorney, Agent, or Firm*—Michael J. Striker

[57] ABSTRACT

An apparatus for the manufacture of multilayer articles has a plurality of female dies mounted in a rotary disc. A plurality of feeding devices equal in number to the number of layers in the articles to be manufactured is distributed about the rotary disc. Each feeding device admits a quantity of material into the female dies as these travel by. A compressing device is arranged downstream of each feeding device as seen in the direction of movement of the female dies. The compressing devices compress the material admitted into the female dies by the respective feeding devices and also cause the various layers of material to adhere to one another. When the required number of layers has been formed, the resulting article is ejected from the respective female die. One or more of the feeding devices is movable to an inoperative position in which it is unable to feed the female dies. This movement may be effected while the female dies rotate. The purpose of a movable feeding device is to permit the dosing accuracy of another feeding device to be checked. Thus, by moving a feeding device to an inoperative position, it becomes possible to accurately weigh out the dose of material fed to a female die by another feeding device since the material normally fed by the movable feeding devices does not interfere with the weight measurement. Furthermore, movement of a feeding device to an inoperative position enables a dose of material which is to be weighed to be given a second compression with the compressing device downstream of the movable feeding device. This enhances the cohesiveness of the dose to be weighed.

10 Claims, 4 Drawing Figures

APPARATUS FOR THE MANUFACTURE OF LAYERED ARTICLES SUCH AS MULTILAYER TABLETS

BACKGROUND OF THE INVENTION

The invention relates generally to an apparatus and method for the manufacture of multilayer articles. The invention is particularly concerned with the manufacture of multilayer tablets such as are used, for example, for medicinal purposes.

A known apparatus for the manufacture of multilayertablets has a rotary disc on which there are mounted several female dies. A minimum of two feeding devices for supplying the female dies with flowable material are arranged adjacent the rotary disc. Compressing devices are provided and cooperate with the female dies to compress the material fed into these dies. The compressing devices also cause adjacent layers to adhere to one another.

With apparatus of this type, control purposes require that it be possible to determine the weight of the first compressed layer. This is necessary since the weight of the second layer, which is pressed onto the first layer and is often constituted by the working substance of the tablets, is determined on the basis of the weight of the first layer.

The control tests run until now have been expensive and, in practice, have also sometimes been found to be inadequate. The reasons for this are as follows:

In principle, it would be possible to eject the compressed first layer of a tablet from its female die via an ejector during rotation of the rotary disc and to perform a measurement on this layer. The ejection could be accomplished after the layer leaves the first compressing station which follows the first feeding station in the direction of rotation of the rotary disc. In practice, however, this procedure does not work. The reason resides in that the first layer is not highly compressed by the first compressing station in order that it may be made to adhere to the second layer. Accordingly, the first layer disintegrates upon being ejected from the female die.

On the other hand, if the first layer were permitted to pass through a second feeding station and the associated second compressing station so that a higher degree of compression is obtained, then a second layer is formed before ejection from the female die. In such an event, a weight measurement would not yield information on the weight proportion of the first layer in relation to the second layer, that is, in relation to the weight of the working substance of the tablet.

One attempt to overcome the above problem has involved increasing the pressure exerted by the first compressing station during passage therethrough of a first layer intended for control purposes. This procedure, however, exhibits the disadvantage that it becomes necessary to readjust the compressing force downwardly after the test sample, which has been compressed to a greater degree than usual for a first layer, has been removed. The reason that such a readjustment is required resides in that a satisfactory bond between a first layer and a subsequently deposited second layer can be obtained only when the first layer has not been too highly compressed. The problem with readjusting the compressing force is that there is no assurance that the values obtained during the control tests apply to tablets which are manufactured under different pressure conditions.

SUMMARY OF THE INVENTION

It is an object of the invention to provide an apparatus and method for manufacturing multilayer articles, particularly multilayer tablets for medicinal purposes and the like, which make it possible to continuously obtain a satisfactory determination of the weights of one or more layers of the articles without readjustment of the compressing force.

Other objects of the invention will become apparent as the description proceeds.

According to the invention, an apparatus for making multilayer articles, particularly tablets, includes at least one female die movable along a predetermined path, e.g., a circular path, and at least one feeding device for admitting material into the female die. The feeding device is movable between operative and inoperative positions in which feeding of material into the female die is respectively permitted and prevented. The feeding device is arranged so that movement between these positions can occur while the female die travels along its predetermined path. Means is provided for moving the feeding device between its operative and inoperative positions.

The invention will be described herein with reference to an apparatus and method for making tablets having two layers.

Such an apparatus may comprise a rotary disc carrying female dies as well as first and second feeding stations for respectively admitting the first and second layers of the tablets into the female dies as these rotate by the feeding stations. A first compressing station may be associated with the first feeding station whereas a second compressing station may be associated with the second feeding station. The first compressing station will usually be located downstream of the first feeding station as seen along the direction of rotation of the female dies and, similarly, the second compressing station will usually be located downstream of the second feeding station as seen along the direction of rotation of the female dies.

Although the description herein will make reference to first and second feeding stations, or to first and second feeding devices and compressing stations, this is not intended to limit the invention to an apparatus with two feeding devices and/or two compressing stations. This terminology, i.e., "first" and "second," has been chosen inasmuch as the manufacture of tablets having two layers is being described. The invention is, however, equally applicable to apparatus for the manufacture of tablets having three, four or more layers since the same problems which the invention intends to overcome exist and may be solved using the inventive means. Such apparatus for making tablets with more than two layers could correspondingly have three, four or more feeding devices and three, four or more compressing stations. In an apparatus of the type contemplated by the invention, it may be advantageous when not only one but two or more of the feeding devices are, in accordance with the invention, provided with their own drive means via which they may be moved between operative and inoperative positions individually or, at least to some extent, simultaneously during rotation of the rotary disc carrying the female die.

According to a preferred embodiment of the invention, the operative position of a feeding device is one in which the feeding device projects into or overlaps the path of the female dies. The inoperative position of a feeding device is one in which the latter does not project into or overlap the path of the female dies.

When it is desired to determine the weight of one or more layers of a tablet with an arrangement according to the invention, a displaceable feeding device is moved away from the rotary disc. This permits the compressing station located downstream of the retracted feeding device to be used for effecting a further compression of the test sample, without the addition of new material from the retracted feeding device, before the test sample is ejected from the female die. Thus, the test sample is given additional strength by being subjected to a further compression while, at the same time, there is need to readjust any compressing station when the retracted feeding device has been returned to its operative position. Furthermore, situations may arise where test samples are withdrawn during operation of the apparatus with a feeding device in its inoperative or retracted position, and an adjustment of a compressing station is subsequently found to be necessary and is made with the feeding device in its retracted position. With the apparatus of the invention, readjustment of the compressing station or the associated press once the feeding device has returned to its operative position is not required. Another advantage of the invention resides in that losses of valuable tablet material during the performance of control tests are smaller than with conventional apparatus and methods. In addition, a substantial saving in time may be achieved with control tests using the invention as compared to control tests carried out with the known apparatus and methods for manufacturing tablets. A further advantage becomes apparent when it is considered that an apparatus of the type being dealt with here provides an exact weight only after operating for some period of time.

It is already known to so arrange a feeding device for a rotary disc carrying female dies that the feeding device may be moved away from the rotary disc as a complete structural entity after loosening screw connections or bolts. This is intended to permit the repair of component parts as well as the performance of other functions such as, for example, cleaning of the feeding device. However, this arrangement is not suited for the performance of control tests on the tablets or for determining the weights of one or more layers of the latter. The reason resides in that the applicable operating instructions specify that demounting of the feeding device, as well as other manipulations on the apparatus, be performed only when the rotary disc is at a standstill.

It has been found to be advantageous when, according to another embodiment of the invention, a displaceable feeding device is movable along a substantially straight line. It is further of advantage for the feeding device to be provided with guide rollers in order to achieve this and for the guide rollers to be mounted for movement in a guide slot of a support plate or the like. Such an arrangement enables the linear displacement between the operative and inoperative positions to be accomplished quickly and easily. In order to effect the displacement, the feeding device is favorably provided with a piston rod which can be pneumatically, hydraulically or electrically driven. By moving the feeding device to its inoperative position for a short period of time, a construction of this type makes it possible to obtain test samples without interruption in the operation of the apparatus, as well as adjust the apparatus while it is running and to thereafter produce more multilayer tablets. The test samples may be obtained while the apparatus is running at full speed beneath the conventional protective hood. This is also possible with relatively large, that is, heavy, apparatus and can be accomplished without the need for moving the drive means or motor which is provided for displacing the feeding device and which may, for instance, be mounted above the feeding device, together with the latter. Thus, in accordance with another embodiment of the invention, the feeding device is connected with its drive motor via a telescope-like or extensible articulated linkage. On the other hand, in order to connect the feeding device with a stationary, relatively heavy hopper or the like, a flexible hose or tube may be utilized.

A method according to the invention of manufacturing multilayer articles, particularly multilayer tablets, involves moving a female die along a predetermined path, e.g., a circular path, and admitting a layer of material into the female die from a feeding device stationed along the path in an operative feeding position. The layer is densified, e.g., compressed, at a densifying station along the path and an additional layer of material is admitted into the female die from a feeding device stationed along the path in an operative feeding position. Both of the layers are now densified, e.g., compressed, at a densifying station along the path and the layers are caused to adhere to one another. The adherent layers are ejected from the female die. A sample for control purposes is obtained by: admitting one of the layers into the female die from a feeding device stationed along the path in an operative feeding position; densifying, e.g. compressing, this layer at a densifying station along the path; displacing the feeding device which admits the other layer into the female die to an inoperative feeding position while the female die moves along its path so as to prevent admission of this other layer into the female die; densifying, e.g. compressing, the layer which is in the female die again at a densifying station along the path so that the cohesiveness of the layer is increased sufficiently to permit ejection thereof from the female die substantially as a cohesive unit; and ejecting the thus-densified layer from the female die.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The apparatus illustrated in FIGS. 1–4 is here assumed to be an apparatus for manufacturing multilayer tablets for medicinal or other purposes.

Figure 1:
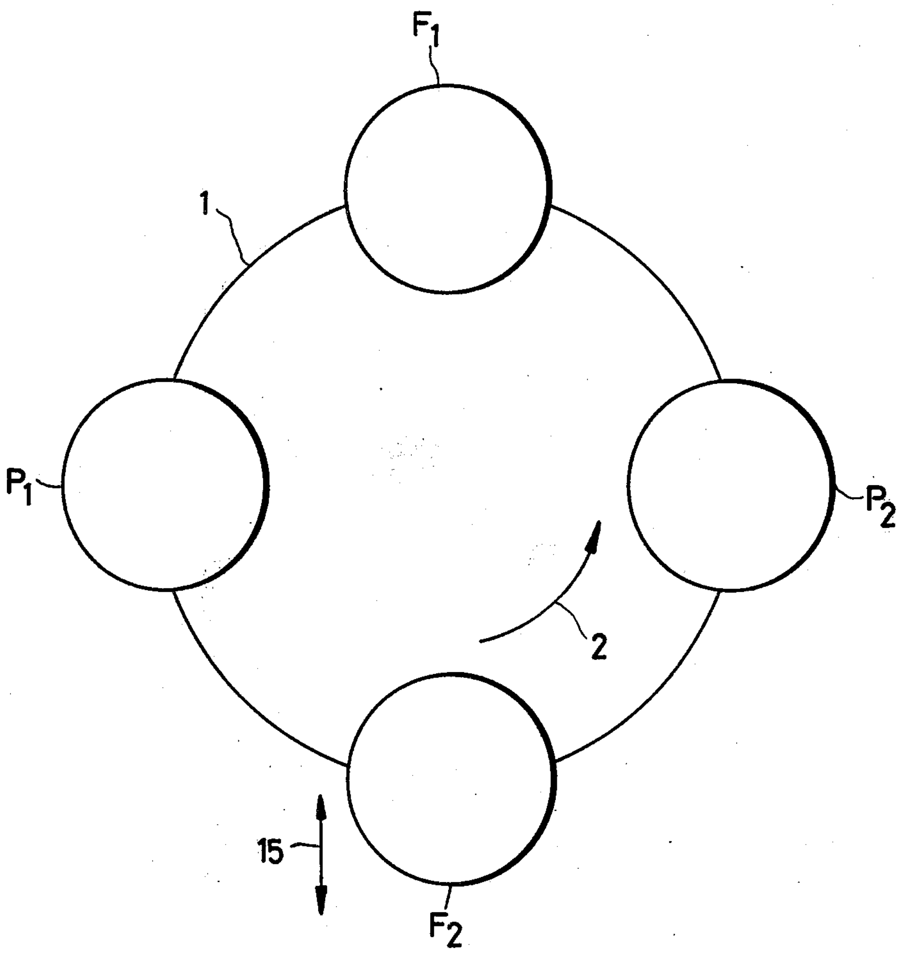
FIG. 1 diagrammatically illustrates an apparatus according to the invention having a rotary disc with two associated feeding devices and two associated compressing devices.

As shown in FIG. 1, the apparatus includes a rotary disc 1 which rotates in a counterclockwise direction indicated by the arrow 2. The disc 1 is adapted to carry female dies.

The illustrated apparatus is intended for the manufacture of two-layer tablets. To this end, two feeding stations F1 and F2 are provided at diametrically opposite locations of the disc 1. A pair of compressing stations P1 and P2 is arranged between the feeding stations F1 and F2 so that the compressing station P1 is located immediately downstream of the feeding station F1 in the direction of rotation of the disc 1 and the compressing station P2 is located immediately downstream of the feeding station F2 in the direction of rotation of the disc 1. The compressing station P1 and P2 may, for example, include male dies adapted to cooperate with the female dies carried by the rotary disc 1.

At the feeding station F1, a first layer of particulate material, e.g. powder, is fed into the female dies carried by the rotary disc 1. This first layer of particulate material is precompressed at the compressing station P1. At the feeding station F2, a second layer is admitted into the female dies mounted on the rotary disc 1. The second layer is compressed together with the first layer at the compressing station P2 and the two compressed layers adhere to one another upon leaving the compressing station P2 so that a two-layer tablet is obtained. The finished tablet is ejected from its female die between the compressing station P2 and the first feeding station F1.

The feeding stations F1 and F2 may be moved out of the path of rotation of the female dies while the rotary disc 1 rotates. For this purpose, both of the feeding stations F1 and F2 are provided with individual drive means.

Figure 2:
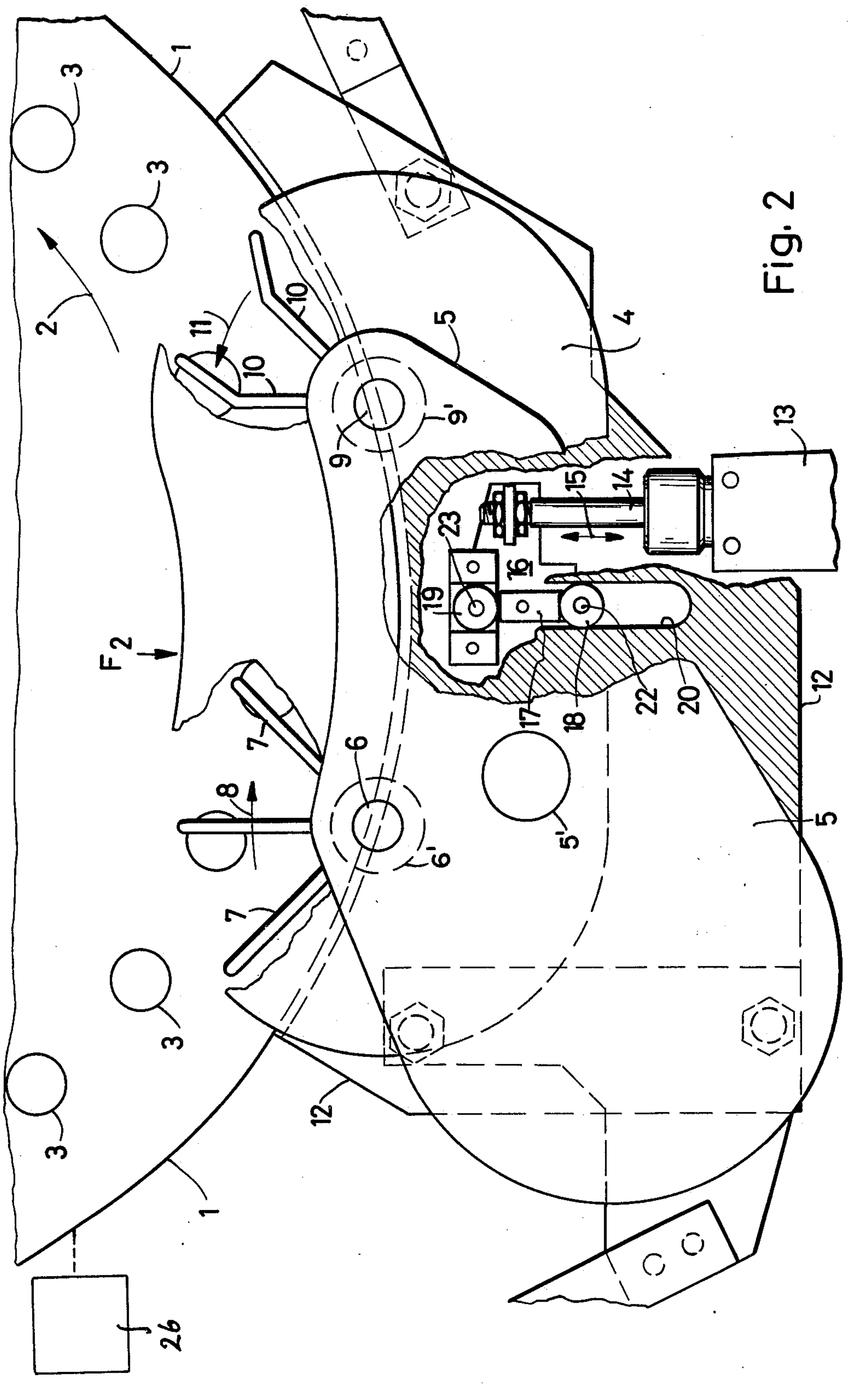
FIG. 2 is a partly sectional top view of a feeding device and a drive for the displacement thereof in accordance with the invention.

The construction of an individual feeding station F1 or F2 and its associated drive means may be seen particularly clearly from FIG. 2 where also the female dies carried by the rotary disc 1 are shown and identified by the reference numeral 3. FIG. 2 further illustrates that a conventional drive 26 is provided for rotating the rotary disc 1.

Only the feeding station F2 is shown in FIG. 2 but it will be understood that the feeding station F1 may have a similar construction. The feeding station F2 is seen to have a bottom plate 4 on which there is mounted a transmission gear housing 5. A feeding wheel 6 provided with radially extending vanes 7 is driven by gear 6' in the housing 5 and rotates in clockwise direction in the bottom plate 4 as indicated by the arrow 8. In the operative position of the feeding station F2, the vanes 7 overlap the female dies 3 and thus fill particulate tablet material into the female dies 3. A dosing wheel 9 is arranged behind the feeding wheel 6 in the direction of rotation of the rotary disc 1. The dosing wheel 9 has bent vanes 10 and is driven by gear 9' to rotate in counterclockwise direction as indicated by the arrow 11. The vanes 10 of the dosing wheel 9 remove excess particulate material which piles up on the female dies 3 and convey the excess material back to the working region of the feeding wheel 6.

Fresh particulate material is brought to the feeding wheel 6 via a non-illustrated hose connected to the inlet port 5' on the upper side of the housing 5.

The feeding station F2 is mounted for linear displacement in two opposite directions as indicated by arrow 15, on a stationary support or carrier plate 12. For its displacement, the feeding station F2 is provided with guide and drive elements 13 to 23 as will be explained below.

A compressed air cylinder 13 is provided for moving the feeding station F2. A piston is mounted in the cylinder 13 for back-and-forth movement therein and is connected with a piston rod 14. The piston rod 14 moves back-and-forth in the manner indicated by the double-headed arrow 15. A plate 16 is secured to that end of the piston rod 14 remote from the cylinder 13 and carries a bridge member 17. A pair of guide rollers 18 and 19 is rotatably mounted on the bridge member 17. The guide rollers 18 and 19 run in a guide slot 20 provided in the stationary carrier plate 12. The guide rollers 18 and 19 have shafts 22 and 23, respectively. The shafts 22 and 23 are screwed into the bottom plate 4 of the feeding station F2 at the lower side of the bottom plate 4.

By moving the piston rod 14 back-and-fourth as indicated by the arrow 15, the feeding station F2 comprising the bottom plate 4 and the drive housing 5 is similarly moved back-and-forth due to the fact that it shifts on the stationary carrier plate 12. The range over which the feeding station F2 can be displaced in guide slot 20 is such that in one terminal position thereof in which roller 18 abuts against the outer end of slot 20, the female dies 3 can move by the feeding station F2 out of the range of vanes 7, that is, without being filled, whereas in the other terminal position thereof (in operative position as shown in FIG. 2) the female dies 3 are overlapped by vanes 7 in the feeding station F2, that is, are filled by the latter. An exemplary, but non-limiting, range of movement for the feeding station F2 is 4 centimeters.

Figure 3:
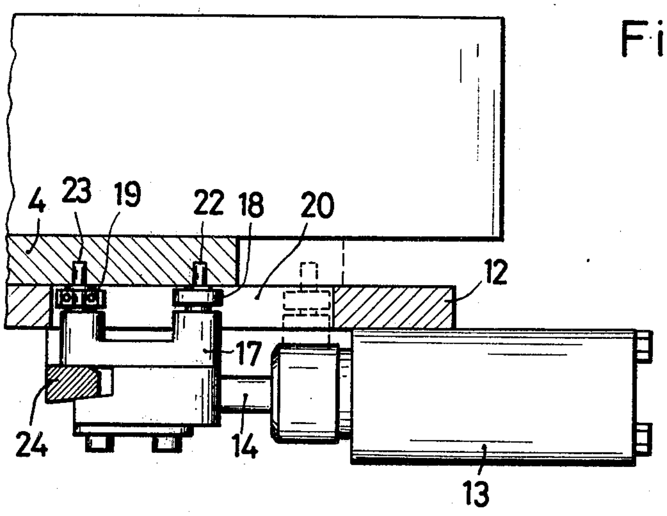
FIG. 3 is a partly sectional side view of the drive of FIG. 2.

When the feeding station F2 has been moved into its operative position, it is preferable to lock it in this position. Locking of the feeding station F2 in its operative position may, for example, be accomplished as shown in FIG. 3. Here, a locking action is achieved by means of a wedge 24 which is secured to the carrier plate 12 and causes the feeding station F2 to be pulled downwardly via the bottom plate 4 thereof.

Figure 4:
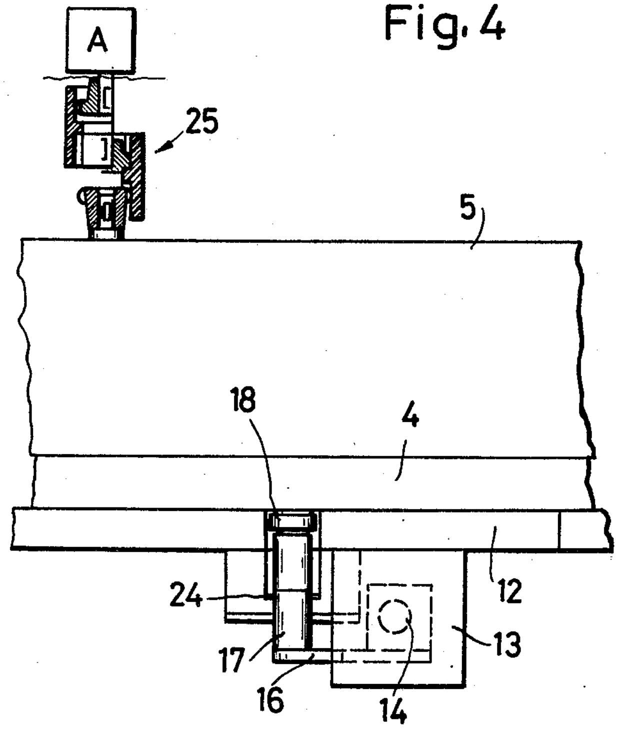
FIG. 4 is a partly sectional front view of the drive of FIG. 2.

As illustrated in FIG. 4, a separate drive motor "A" is provided for driving the gears 6' and 9' in housing 5 of the feeding station F2. In order to eliminate the necessity of moving the drive motor "A" along with the feeding station F2 during displacement of the latter, the gearing in the housing 5 of the feeding station F2 is driven by the drive motor "A" via a telescope-like or extensible articulated linkage 25. Only the lower portion of the articulated linkage 25 is shown, and the pivots corresponding to this portion of the articulated linkage 25 may be clearly seen. The upper portion of the articulated linkage 25, which is located beneath the drive motor "A," is constructed similarly to the lower portion of the articulated linkage 25. The articulated linkage 25 is designed so that angular movement, as well as axial extension, may occur.

It will be understood that each of the elements described above, or two or more together, may also find a useful application in other types of elements and operations differing from the types described above.

While the invention has been illustrated and described as embodied in an apparatus for and a method of manufacturing multilayer tablets, it is not intended to be limited to the details shown, since various modifications and structural changes may be made without departing in any way from the spirit of the present invention.

Withour further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for making multilayer articles, particularly tablets, comprising a succession of dies supported for movement along a predetermined path; at least two feeding devices arranged along said path in an operative position in which they feed material into said dies; at least two compressing devices arranged in said path downstream of respective feeding devices to compress material in said dies; and reciprocating means for moving at least one feeding device into an inoperative position spaced apart from said path to interrupt the feeding of said material and to enable the withdrawal of samples of precompressed material from said dies without interrupting the movement of the latter.

2. Apparatus as defined in claim 1, wherein said succession of dies is mounted in a rotary disc.

3. Apparatus as defined in claim 1, wherein each feeding device includes rotary vaned wheels for distributing said material, said wheels and said path overlap when said feeding device is in said operative position, and said wheels and said path are substantially free of overlap when said feeding device is in said inoperative position.

4. Apparatus as defined in claim 3, wherein said feeding device is movable between said positions along a substantially linear path.

5. Apparatus as defined in claim 3, further comprising a separate driving motor and extensible articulated linkage for coupling said motor to said vaned wheels.

6. Apparatus as defined in claim 1, said moving means comprising a support for said feeding device; and wherein said support is provided with a guide slot and said feeding device is provided with guide rollers which engage said slot to permit guided movement of said feeding device between said positions.

7. Apparatus as defined in claim 1, wherein said moving means comprises a piston-and-cylinder arrangement.

8. Apparatus as defined in claim 7, wherein said arrangement is pneumatically driven.

9. Apparatus as defined in claim 7, wherein said arrangement is hydraulically driven.

10. Apparatus as defined in claim 1, further comprising locking means for locking said feeding device in said operative position.

* * * * *